(12) United States Patent
Uecker et al.

(10) Patent No.: US 9,000,329 B2
(45) Date of Patent: *Apr. 7, 2015

(54) WELDING ARC STABILIZATION PROCESS

(75) Inventors: James Lee Uecker, Appleton, WI (US); Robert Raimund Davidson, New London, WI (US); Charles Lyle Kaufman, Neenah, WI (US); Michael Todd Klegin, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1584 days.

This patent is subject to a terminal disclaimer.

(21) Appl. No.: 12/040,183

(22) Filed: Feb. 29, 2008

(65) Prior Publication Data

US 2008/0142493 A1 Jun. 19, 2008

Related U.S. Application Data

(63) Continuation of application No. 10/710,593, filed on Jul. 22, 2004, now Pat. No. 7,339,135.

(51) Int. Cl.
*B23K 9/12* (2006.01)

(52) U.S. Cl.
CPC ...................................... *B23K 9/125* (2013.01)

(58) Field of Classification Search
USPC .................. 219/130.21, 130.4, 137.2, 137.21, 219/137.31, 137.7, 137.71, 137 R, 124.01, 219/121.11, 124.02, 125.1
See application file for complete search history.

(56) References Cited

U.S. PATENT DOCUMENTS

| | | | |
|---|---|---|---|
| 2,806,127 A | 9/1957 | Hackman et al. | |
| 3,141,085 A | 7/1964 | Manz | |
| 3,934,110 A | 1/1976 | Denis | |
| 4,560,857 A | 12/1985 | Segawa et al. | |
| 4,835,360 A * | 5/1989 | Parks et al. | 219/137 PS |
| 4,935,598 A | 6/1990 | Ward | |
| 5,168,144 A * | 12/1992 | Hongu et al. | 219/137.71 |
| 5,412,175 A * | 5/1995 | Shimogama | 219/125.1 |
| 5,486,679 A | 1/1996 | Hamura et al. | |
| 5,630,955 A | 5/1997 | Kosaka et al. | |
| 6,066,831 A | 5/2000 | Ihara et al. | |
| 6,207,928 B1 | 3/2001 | Kawamoto et al. | |
| 6,621,049 B2 | 9/2003 | Suzuki | |
| 2002/0079302 A1* | 6/2002 | Hutchison et al. | 219/130.21 |
| 2004/0016737 A1* | 1/2004 | Huismann et al. | 219/137 PS |

FOREIGN PATENT DOCUMENTS

| | | |
|---|---|---|
| DE | 3827509 A1 | 2/1990 |
| EP | 0386791 A2 | 9/1990 |
| EP | 0423088 A1 | 4/1991 |

* cited by examiner

*Primary Examiner* — Brian Jennison
(74) *Attorney, Agent, or Firm* — Fletcher Yoder P.C.

(57) ABSTRACT

A system and method for stabilizing a welding arc is disclosed. The method of initiating the arc includes the steps of defining a wire feed speed based on a user selected wire feed speed and then abruptly reducing the wire feed speed before the wire feed speed reaches a relatively stabilized speed for welding, thereby allowing a welding arc to initiate and propagate to a generally steady state.

20 Claims, 6 Drawing Sheets

WELDING ARC STABILIZATION PROCESS

CROSS-REFERENCE TO RELATED APPLICATION

The present application is a continuation of and claims priority to U.S. Ser. No. 10/710,593 filed Jul. 22, 2004, the disclosure of which is incorporated herein by reference.

BACKGROUND OF THE INVENTION

The present invention relates generally to welding systems and, more particularly, to a welding system configured to automatically adjust a wire feed speed to quickly and consistently generate stable welding arcs.

During a welding process, a filler material, or wire, is typically introduced to a workpiece. A power source generates an electrical signal that results in an electrical potential between the workpiece and the filler material when a separation is maintained therebetween. This electrical potential generates an arc between the filler material and the workpiece that then generates a weld pool. As the arc is initiated, if the filler material cannot support the electrical potential, a section of the filler material may collapse. Conversely, if the electrical potential is insufficient to liquefy a portion of the filler material to generate the weld pool, a short circuit condition can develop between the filler material and the workpiece that will result in the base of the arc as the filler material contacts the workpiece. As such, the parameters of the weld power signal and the rate of delivery of filler material directly effect weld arc generation and the quality of the starting arc.

Wire feeders are typically used to feed the filler material, generally a metal wire, into a weld during a welding process, such as Gas Metal Arc Welding (GMAW) or other welding processes. Typical wire feeders have a drive roller assembly for driving the metal feed from a feed spindle through a welding gun for introduction to the weld. Power is supplied to the drive roller assembly by a welding power supply via a weld cable. The speed in which the metal filler material is fed to the weld is known as the "wire feed speed" (WFS), and can be selected by an operator of the welding device who presets the WFS to a desired wire feed speed. In other processes, the WFS can be adjusted to maintain a constant parameter, such as in constant voltage (CV) welding, constant current (CC) welding, or constant voltage-constant current (CV-CC) welding. Typically, the WFS is adjusted based on the thickness of the metal being welded, a wire deposition rate, a desired material transfer mode, and desired weld power parameters such as a weld voltage or a weld current. The WFS is set to perform a desired welding application.

During a given welding process, if the welding arc is underpowered, the weld strength can be insufficient to adequately join the materials being welded. On the other hand, if the welding arc is overpowered, it is possible to "burn through" the materials being welded. Between these two extremes there is a range of power settings and wire feed speeds where welding can be performed, but may not have a preferred arc characteristic. That is, if the power and feed speed result in a slightly underpowered welding arc, the welding process can repeatedly arc and short as the wire touches the work piece resulting in a spattered weld. Alternatively, if the power and feed speed result in a slightly overpowered weld, the welding arc can repeatedly be formed and collapse as extended sections of weld wire are prematurely introduced into the weld, resulting in poor consistency. A weld produced with either the overpowered or underpowered arc characteristics can have varying degrees of poor weld quality in strength and/or aesthetics, inefficient power usage, and overall reduced operation efficiency.

Various known welding techniques have attempted to address the issue of stable weld arc generation, or arc starts, with mixed results. One such technique requires using a motor with retract capabilities, touching the wire to the workpiece, retracting to initiate an arc, and then feeding wire back into the weld after the start is completed. This technique substantially increases system complexity by requiring a fast retract motor and associated circuitry. It is also generally slower as it requires substantial changes in both wire feed direction and repeated wire feed speed accelerations and decelerations. Other techniques provide for adjusting the power, voltage, or current supplied to the weld from a power source during arc starts. These techniques monitor voltage and/or current at the weld and adjust the amount of voltage or current provided thereto in an attempt to better control the arc characteristics. Other techniques provide a means for retracting the wire once an arc is detected. Because these systems directly control the power signal provided to the weld, they must be relatively robust to support and manipulate the power signal required for welding processes. The robust nature of the control system increases assembly, repair, and manufacture costs by requiring a device having additional components and circuitry as well as increasing the overall complexity of the device.

It would, therefore, be desirable to have a system and method capable of generating a stable welding arc that is relatively simple in construction and efficient in operation.

BRIEF DESCRIPTION OF THE INVENTION

The present invention provides a system and method of generating a stable initial welding arc that solves the aforementioned problems. The invention includes a welding system having a power source configured to generate a power signal suitable for welding. A wire feeder is connected to the power source and is configured to deliver a consumable electrode to a weld. A controller automatically adjusts the wire feed speed during initial arc formation and allows the welding arc to fully propagate prior to the wire feed speed reaching a welding feed speed.

The present invention is particularly useful in systems that are capable of pulling the wire, as opposed to those that simply push the wire. This is so because systems that can pull wire generally have better control over wire feed speed and acceleration and deceleration.

Therefore, in accordance with one aspect of the present invention, a method of generating an initial welding arc is disclosed that includes the steps of initiating wire feed speed, temporarily reducing wire feed speed for a period of time based on detection of arc initialization, and then adjusting wire feed speed based on a user selected speed.

According to another aspect of the present invention, a method of establishing a welding arc is disclosed that includes defining a wire feed speed based on a user selected wire feed speed and then reducing the wire feed speed before the wire feed speed reaches the user selected wire feed speed at weld stabilization.

In accordance with yet a further aspect of the present invention, a welding system is disclosed having a power source configured to generate a power signal suitable for welding. A wire feeder is connected to the power source and is configured to deliver a consumable wire electrode to a weld at a wire feed speed. A controller is connected to the wire feeder and is configured to automatically set a rate of acceleration of the wire feed speed, then abruptly reduce the wire feed speed before welding arc stabilization and then set the wire feed speed to a relatively stable speed for welding.

According to another aspect of the present invention, a welding system is disclosed that includes a power source configured to generate a power signal suitable for welding-type applications. A wire feeder is constructed to deliver a filler material to a weld. The welding system includes means for controlling a filler material delivery rate that reduces the delivery rate based on welding arc initialization prior to arc stabilization.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
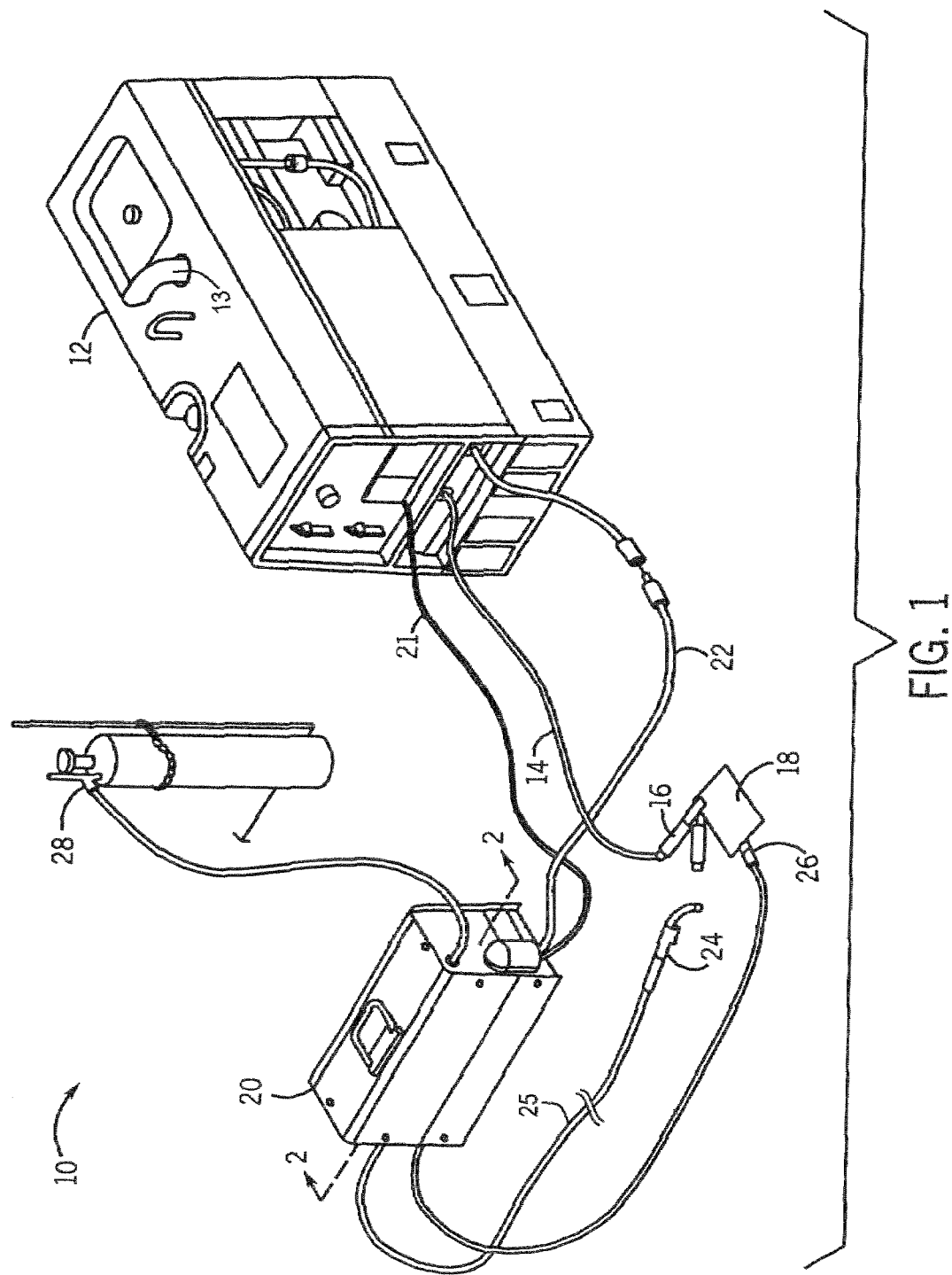
FIG. 1 is a perspective view of a welding system.

Referring to FIG. 1, a welding-type system 10 is shown according to the present invention. System 10 includes a power source 12, which can be an AC or a DC welding power supply operable in a constant current (CC), a constant voltage (CV), or a combination thereof. In one embodiment, an exhaust 13 extends from power source 12 and vents exhaust gas from an internal combustion engine of the power source. It is understood that power source 12 could also be configured to be powered by a generator or a power grid. The power source 12 has a work cable 14 and clamp 16 designed to hold a workpiece 18 for welding. Power source 12 is connected to a wire feeder 20 via cable 22. Although shown as being a separately connected component, it is understood that wire feeder 20 could be physically attached to, or incorporated into, and/or internal to, power source 12. A weld cable 22 is connected between the power source 12 and the wire feeder 20. The wire feeder 20, which in one embodiment is portable, also includes a welding gun or torch 24, and an optional arc sensing lead 26 configured to provide arc condition feedback from workpiece 18 to the wire feeder 20 and/or the power source 12. It is understood that an optional arc sensing lead 26 could be integrated into work cable 14 connecting clamp 16 to power source 12 and/or integrated into cable 25 attaching torch 24 to wire feeder 20 to provide weld torch feedback. A shielding gas cylinder 28 is also connected to the wire feeder 20 to provide shielding gas for the welding process in a known manner.

When the welding torch 24 is positioned proximate to workpiece 18, welding wire is fed into contact with the workpiece 18. Once triggered, an electrical current and voltage are generated between the welding wire and the workpiece that causes the welding wire to be heated and melt. An electrical arc is established which causes the welding wire to continue to melt as well as transfer the melted welding wire to the workpiece 18 where the welding wire fuses with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting to create fusion between two workpieces and between the melted welding wire and the workpiece(s) 18. As the welding torch 24 is translated across the workpiece 18, melted welding wire is continuously transferred to the workpiece 18. The wire feeder is designed to introduce flux cored, solid steel, stainless steel, or aluminum welding wire to a weld. One skilled in the art will appreciate that this technique and these materials are illustrative only, and that the present invention is equivalently applicable with other welding systems having different operating specifications.

Figure 2:
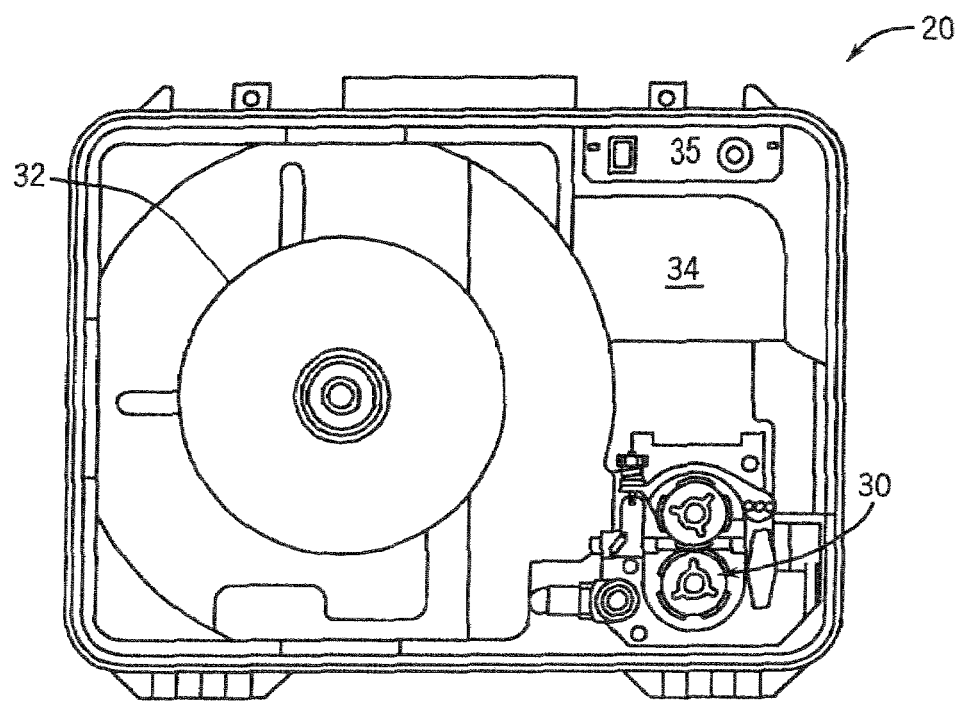
FIG. 2 is a sectional view of the wire feeder taken along lines 2-2 of FIG. 1.
Figure 3:
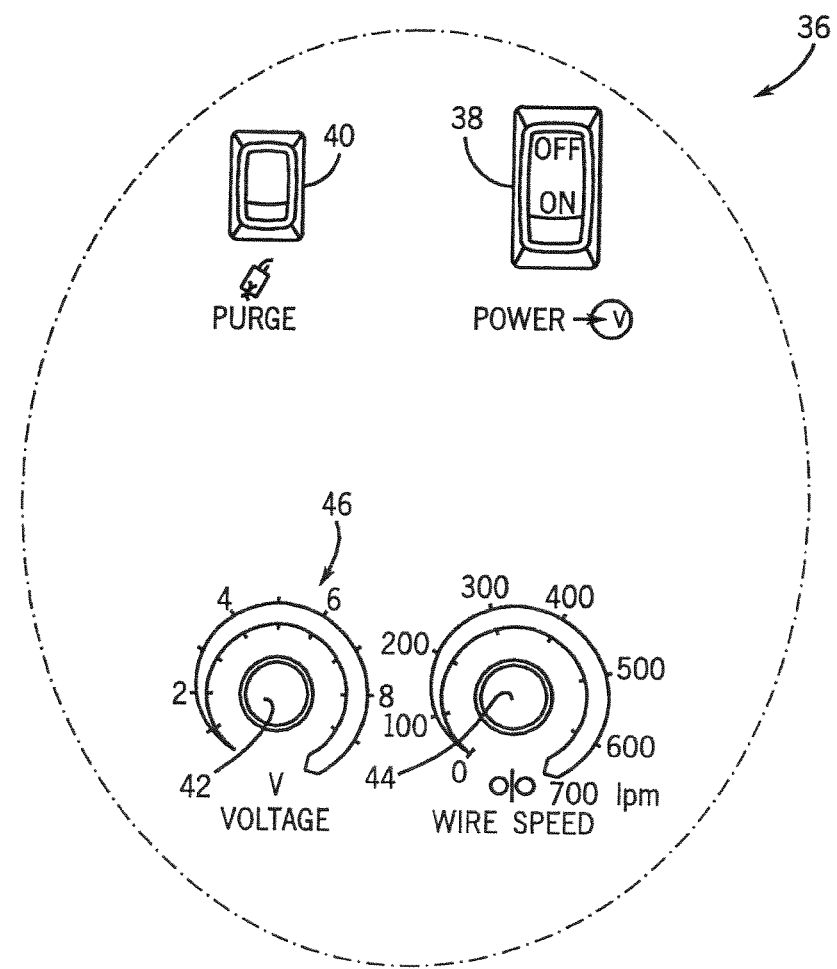
FIG. 3 is a front elevational view of a control panel of the wire feeder illustrated in FIG. 1.
Figure 7:
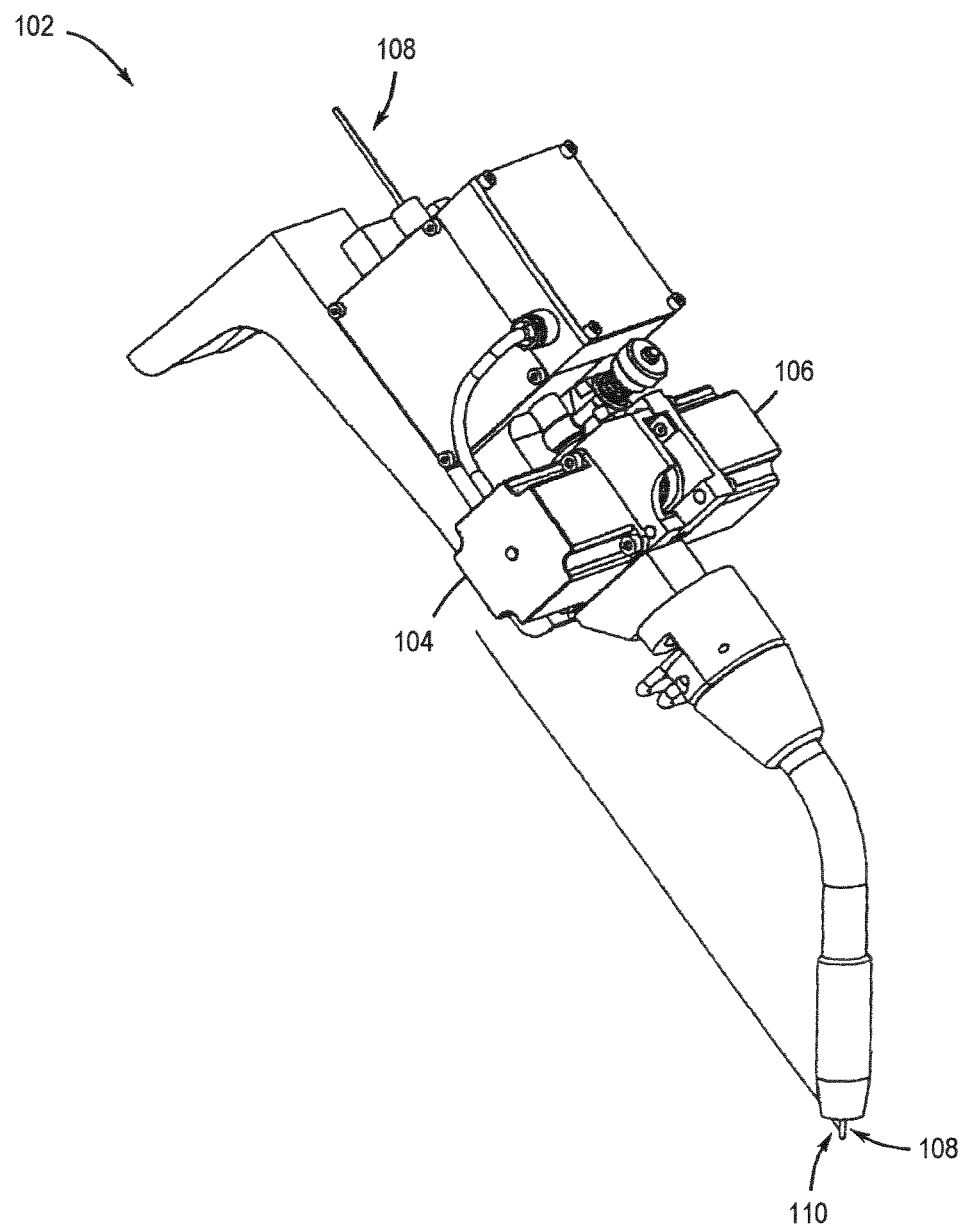
FIG. 7 shows another torch for use with the welding system shown in FIG. 1.

Referring now to FIG. 2, the wire feeder 20 includes a wire drive assembly 30 to drive feed wire from a spool 32 designed to support welding wire (not shown) that is supplied to the weld under control of a controller 34 embodied in operational circuitry secured to a circuit board (not shown) that is connected to the power source 12 through cord 22 and cord 21, as shown in FIG. 1. Alternatively, controller 34 may be incorporated into the power source 12. The controller is governed by a microprocessor capable of being programmed to operate according to certain algorithms and/or programs. User selections or inputs received by the controller from a display and control panel, as shown in FIG. 3, and an internally programmed algorithm cause welding system 10 to operate according to the user selections. Controller 34 has a detection circuit 35 that is connected to the arc sensing lead 26 and configured to detect and communicate characteristics of the welding arc to controller 34. Wire feeder 20 is generally referred to as a push-type wire feeder in that the feed wire is "pushed" to the torch. While the present invention is applicable in such push wire feeders, it is particularly advantageous with pull-type wire feeders, as shown in FIG. 7, wherein the feed wire is pulled from a source to the torch. Additionally, there are circumstances, such as when the torch is located an extended distance from a wire spool, when it is desirable to both push and pull the feed wire to the torch in unison. Such systems are referred to as push-pull type wire feed systems.

Referring now to FIG. 3, a front elevational view of a control panel of a wire feeder is illustrated. Control panel 36 is designed to allow the user to input various welding parameters so as to define the welding process to be carried out. Specifically, the control panel includes an ON/OFF switch 38 that allows the user to switch the wire feeder on or off. Control panel 36 also includes a JOG/PURGE button or switch 40 that allows the user to purge or remove existing gas from the wire feeder. That is, controller 34, shown in FIG. 2, detects activation of purge button 40 of FIG. 3, and in response thereto, transmits a control signal to the gas valve assembly of the wire feeder to cause the drive assembly to purge any residual gas from the wire feeder. Control panel 36 can also include a JOG button that when selected causes controller 34 to transmit a jog command to the drive assembly to step the wire advancement in defined increments.

Control panel 36 also provides a user interface on the wire feeder that allows the user to set a target voltage via control knob 42, as well as a wire feed speed control knob 44. One skilled in the art will appreciate that the functionality achieved with dual knobs 42 and 44 may also be achieved with a single telescoping knob or with the analog or digital switches. Additionally, it is further understood that rather than setting a target voltage, control knob 42 could be configured to provide a target current. As will be described in greater detail below, the wire feed controller will regulate the drive assembly such that the wire feed speed selected by the user via adjusting control knob 44 is automatically adjusted by controller 34 to facilitate smooth and repeatable generation of a relatively stable welding arc. That is, the controller will automatically adjust the wire feed speed so that a relatively stable initial arc is generated independent of the wire feed speed selected by the user. It should be noted, in one embodiment, that a legend 46 associated with voltage adjustment control knob 42 represents a scaled voltage level of the desired target voltage. That is, user adjustment of control knob 42 to reference numeral 2 of legend 46 represents that the user desires the target voltage to be 20V in one case.

Control panel 36 illustrated in FIG. 3 represents an example of a control panel which may be incorporated in the wire feeder. One skilled in the art will readily appreciate that the appearance and/or orientation of the selector switches, knobs, buttons, and the like may differ from that specifically illustrated. Additionally, LCDs and LEDs (not shown) may also be utilized and are considered within the scope of the present invention. For example, control panel 36 may be constructed such that an LCD displays one or more menus that allow the user to interactively set the target arc voltage as well as the initial wire feed speed. In this regard, the user may navigate through a series of menus or windows that are displayed on the LCD in defining the operational parameters of the welding process to be carried out.

Figure 4:
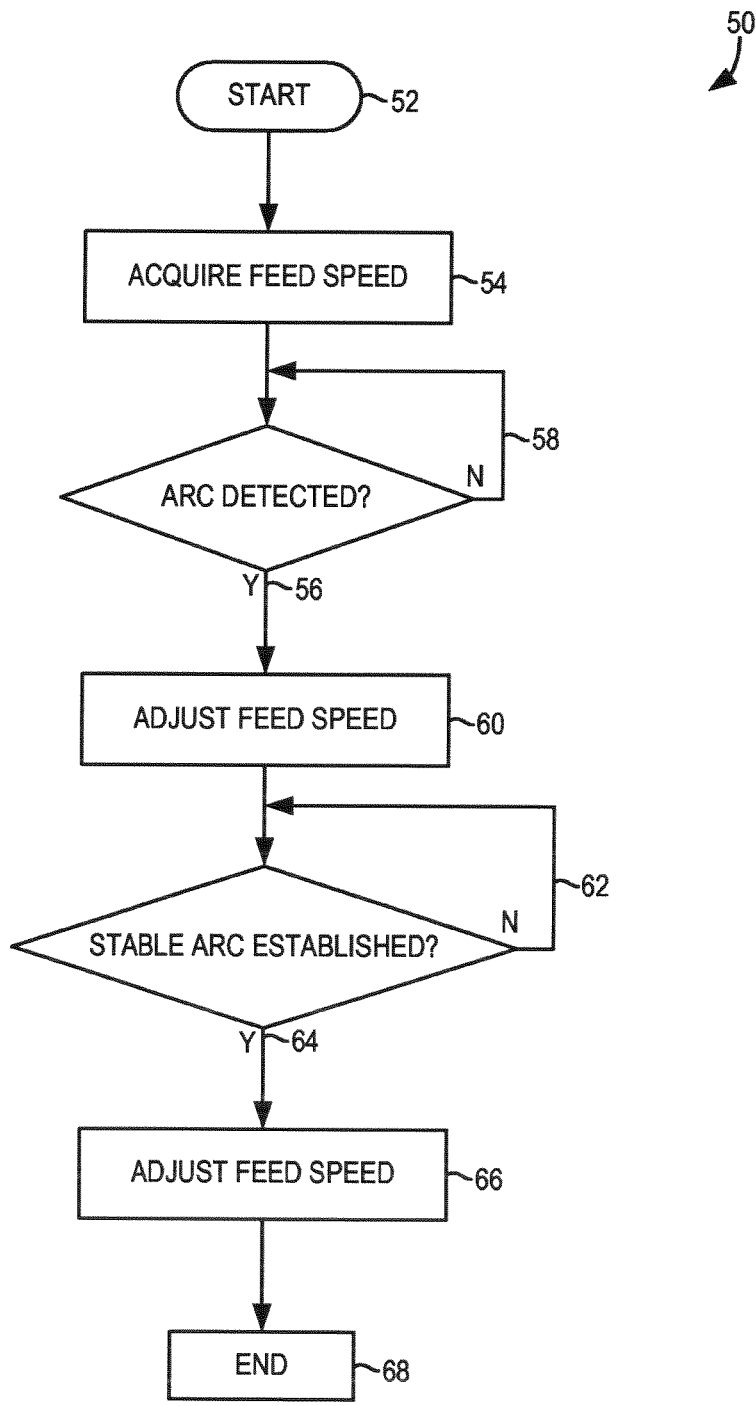
FIG. 4 is a flow chart setting forth the steps of a control algorithm carried out by a controller for allowing generation of stable welding.

As noted above, the present invention provides a controller that is configured to automatically adjust the wire feed speed at which the consumable electrode is delivered to a weld so that a welding arc is consistently and repeatedly generated with an arc initialization to stabilize the welding process more quickly, efficiently, and without operator intervention. Referring now to FIG. 4, a preferred control technique or algorithm 50 for automatically adjusting the wire feed speed is illustrated. The preferred technique or process 50 begins at step 52 with a user setting a constant current (CC) level or a constant voltage (CV) level depending on the welding process desired. The operator can also set a desired wire feed speed on a control menu on the wire feeder such as that illustrated in FIG. 3, or it may be set based on the welding process desired. The controller will then acquire the desired wire feed speed 54 and determine and set a wire speed run-in value. The wire speed run-in value is often less than, but not limited to, the user selected desired wire feed speed. The controller will then transmit a control signal to the drive assembly of the wire feeder such that wire is fed to the weld at a speed equal to the run-in value.

Eventually, as wire is delivered to a desired weld area at the run-in speed, a short circuit or initial arc is detected 56. If no arc has been formed, control technique 50 continues to attempt to detect an initial arc condition 58 until the initial arc is generated. After detection of an initial arc 56, controller 34 automatically adjusts the feed speed 60 to allow the arc to propagate from the initial arc to a sustainable, relatively stable, weld arc. After the initial arc has been detected, the wire speed is preferably adjusted to a minimum value, which can be zero, for a duration of time as determined by the desired wire feed speed. Optionally, rather than specify the duration of the minimum wire feed speed value, control algorithm 50 could continue to monitor the arc condition 62 until a stable weld arc is formed 64. After the duration of time with the wire speed adjusted to the minimum value, and having thereby formed a relatively stable welding arc between the feed wire and a workpiece, control algorithm 50 adjusts the wire feed speed 66 to the user selected desired feed speed for the duration of the welding operation. Having established a generally stable welding arc, control algorithm 50 ends at 68 and is configured to repeat with the next initial arc generation.

Figure 5:
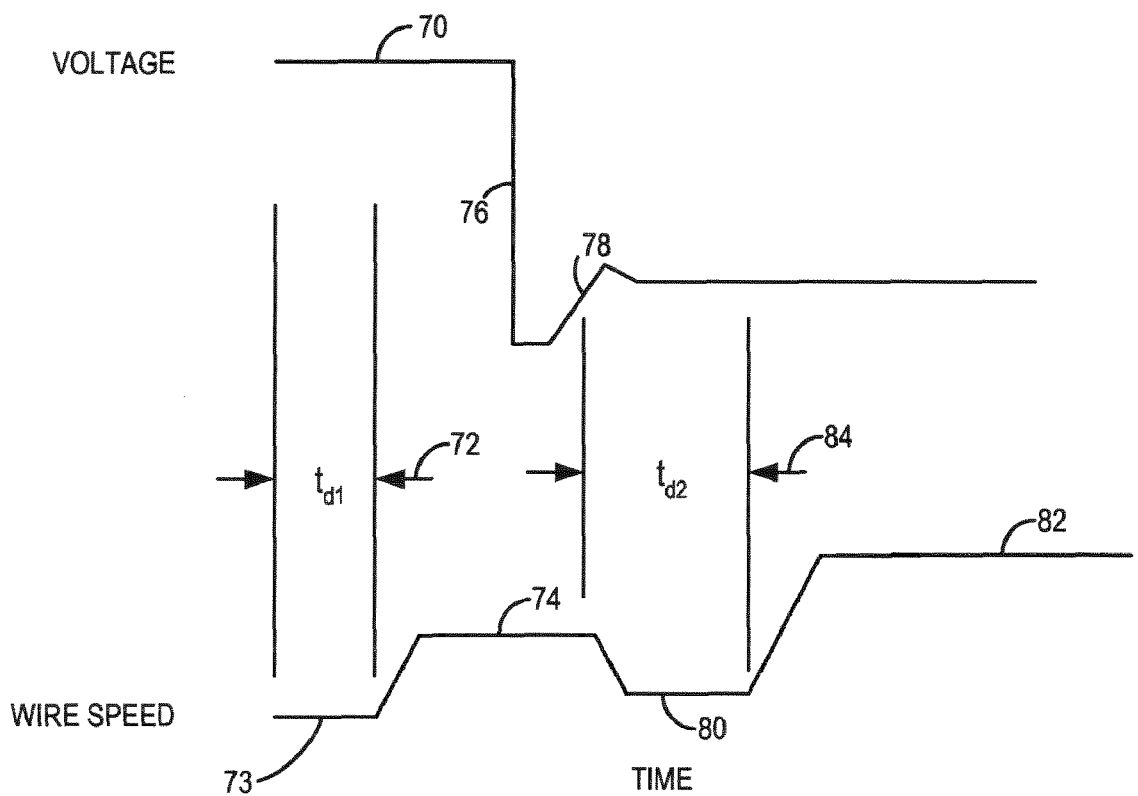
FIG. 5 is a graphical representation of voltage versus time showing the operation of the control algorithm shown in FIG. 4.
Figure 6:
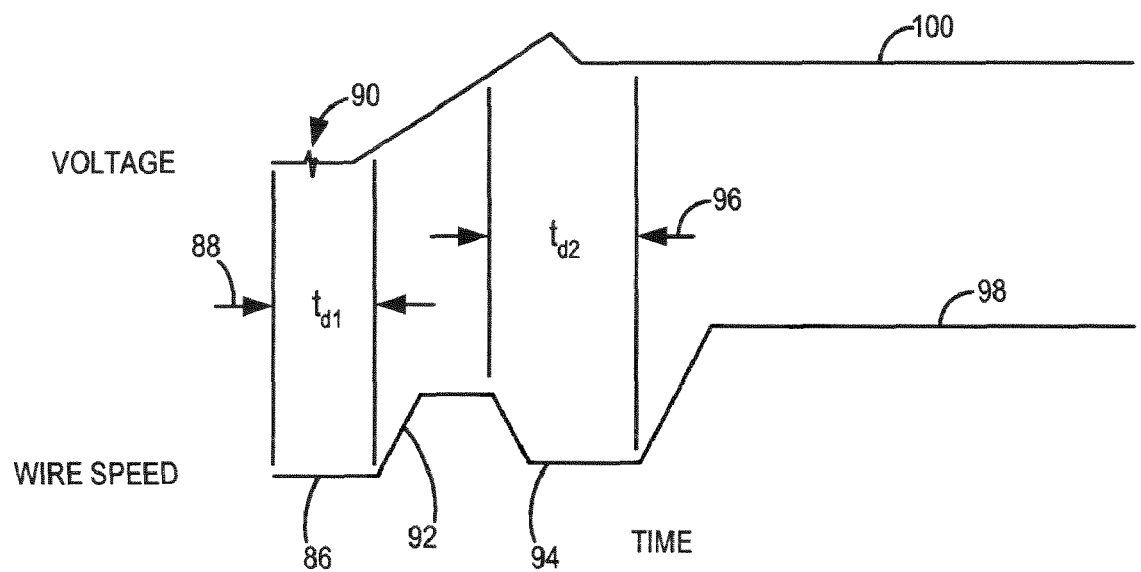
FIG. 6 is a graphical representation of voltage versus time showing an alternate operation of the control algorithm shown in FIG. 4.

FIG. 5 shows the generation of a stable arc condition when the torch is initiated in an open circuit condition with a work piece. An open circuit voltage 70 is initiated at torch trigger activation. A delay 72 is maintained between the torch trigger activation and the wire feed speed 73, which is increased to a run-in rate 74 to ensure sufficient arcing at the site of the welding application. It is understood that the ramps shown in the wire feed speed in FIGS. 5 and 6 are representative of component lag and that the wire feed speed command is essentially a step function and is therefore nearly instantaneous. Delay 72 is preferably approximately 20 ms but, understandably, could be modified for a particular welding application. When the feed wire touches the work piece, a short circuit voltage 76 is detected that initiates a detectable arc 78 between the workpiece and the wire. Upon detection of the initial arc 78, wire feed speed 73 is abruptly reduced to a minimum wire speed 80. Minimum wire speed 80 is less than a user selected wire feed rate 82 and is maintained for a delay period 84 determined in part by the user selected wire feed speed. It is understood that minimum wire speed 80 could approach zero with a corresponding reduction in the duration of delay period 84. Preferably, delay period 84 is maintained for approximately 50 ms at which time wire feed speed 73 is allowed to then achieve the user selected wire feed rate 82. By abruptly reducing wire feed rate 73 after the detection of an initial arc 78, a preferred gap is achieved and a relatively stable arc condition is generated.

Comparatively, FIG. 6 shows the generation of a stable welding arc when an initial short circuit condition exists between the welding wire and the workpiece, such as when the two are in very close proximity or contact. Wire feed 86 is delayed a duration 88 to allow generation of an arc. A power source delivers a welding-power signal to the weld and an initial arc 90 is generated during delay duration 88 which is approximately 20 ms. Understandably, initial arc 90 could be formed anytime during delay duration 88 when the electrical potential between the weld wire and the work piece reaches a value capable of melting the wire and then generating an electrical arc between the wire and the workpiece. After delay duration 88, wire feed 86 is increased to a run-in speed 92. Having detected an initial arc 90, wire feed 86 reduces to a minimum wire feed speed value 94 for a duration 96. The duration 96 that wire feed 86 is maintained at the minimum wire feed speed value 94 is determined in part by the user specified wire feed speed. After duration 96 has transpired, wire feed speed 86 is allowed to achieve the user selected wire feed speed 98 and maintains a desired arc power 100.

Regardless whether a welding process is initiated from an open circuit condition or a short circuit condition between the weld wire and the workpiece, controller 34 maintains the weld wire feed speed after the initial arc generation at a speed that maintains and allows the welding arc to form. The speed with which the weld wire is introduced to the weld maintains a desirable gap distance between the work piece and the weld wire as the welding arc is formed. By maintaining a gap distance that can be electrically arced over during arc formation, a welding device is provided that allows for repeated and efficient weld arc formation.

As previously discussed, FIG. 7 shows a torch 102 that can be preferably implemented with the present invention in addition to, or as an alternative to, torch 24. Torch 102 includes housings 104, 106 enclosing a motor. The motor is configured to pull a consumable wire 108. The motor drives paired alignment rollers within the housings 104, 106 to drive the wire from opposite sides of the wire to substantially equalize the driving forces applied to the wire 108. Such a wire driving means is generally referred to as a pull-type wire feeder in that it pulls the wire from a feeder to the torch. It is understood that torch 102 could be combined with wire feeder 24 shown in FIG. 2 to achieve a push/pull wire feed system. Regardless of the wire feed system applied, by manipulating the rate and period of introduction of weld wire to a weld point, the present invention forms a relatively stable weld arc in a repeatable and economical manner.

Therefore, one embodiment of the present invention has a method of stabilizing a welding arc comprising the steps of initiating wire feed speed, temporarily reducing wire feed speed for a period of time based on detection of arc initialization, and adjusting wire feed speed based on a user selected speed.

Another embodiment of the present invention includes a method of establishing a welding arc comprising defining a wire feed speed based on a user selected wire feed speed and reducing the wire feed speed before the wire feed speed reaches the user selected wire feed at weld stabilization.

A further embodiment of the present invention includes a welding system having a power source configured to generate a power signal suitable for welding. The welding system includes a wire feeder configured to deliver a consumable wire electrode to a weld at a wire feed speed. A controller is connected to the wire feeder and is configured to automatically set a rate of acceleration of the wire feed speed, then abruptly reduce the wire feed speed before welding arc stabilization and then set the wire feed speed to a relatively stable speed for welding.

Another embodiment of the present invention has a welding system that includes a power source configured to generate a power signal suitable for welding-type applications. A wire feeder constructed to deliver a filler material to a weld is connected to the power source. The welding system includes means for controlling a filler material delivery rate based on welding arc initialization prior to arc stabilization.

As one skilled in the art will fully appreciate, the heretofore description of welding devices is applicable to all weld systems with wirefeed requirements. Reference to welding power, welding-type power, or welders generally, includes welding, cutting, or heating power. Description of a welding apparatus illustrates just one embodiment in which the present invention may be implemented.

The present invention has been described in terms of the preferred embodiment, and it is recognized that equivalents, alternatives, and modifications, aside from those expressly stated, are possible and within the scope of the appending claims.

What is claimed is:
1. A method of generating a welding arc comprising the steps of:
   initiating a wire feed at a run-in wire feed speed for a weld operation;
   temporarily reducing wire feed speed to a second wire feed speed less than a user selected speed for a period of time during the weld operation based on detection of arc initialization; and
   adjusting wire feed speed to the user selected speed.
2. The method of claim 1, wherein the period of time is determined by the user selected speed.
3. The method of claim 2, wherein the period of time is 50 ms.
4. The method of claim 1, further comprising the step of detecting initialization of a welding arc.
5. The method of claim 4, further comprising the step of delaying a wire drive power until after generation of a welding power signal by a power source.
6. The method of claim 5, wherein a duration of the delay is less than approximately 20 ms.
7. The method of claim 1, further comprising initiating a power source power signal and initiating a wire feeder power signal by a trigger.
8. The method of claim 1, further comprising at least one of the steps of pulling wire from a spool to a torch, pushing and pulling wire to a torch, and pushing wire to a torch.
9. A welding system comprising:
   a power source configured to generate a power signal suitable for welding;
   a wire feeder connected to the power source and configured to deliver a consumable wire electrode to a weld at a wire feed speed; and
   a controller connected to the wire feeder and configured to:
   define the wire feed speed to a run-in wire feed speed;
   reduce the wire feed speed to a second wire feed speed less than a user selected wire feed speed before weld stabilization; and
   automatically adjust the wire feed speed to the user selected wire feed speed after a predetermined duration of time after weld stabilization.
10. The welding system of claim 9, wherein the controller is further configured to reduce the wire feed speed based on arc initialization.
11. The welding system of claim 9, wherein the controller is further configured to determine a duration of the reduced wire feed speed based on the user selected wire feed speed.
12. The welding system of claim 9, further comprising generating a weld power prior to powering the wire feeder.
13. The welding system of claim 9, wherein the wire feeder is configured to perform at least one of pulling wire from a wire spool to a torch, pushing and pulling wire to a torch, and pushing wire to a torch.
14. The welding system of claim 9, wherein the controller is further configured to reduce the wire feed speed to approximately zero between the run-in speed and reaching the user selected wire feed speed.
15. A welding system comprising:
   a power source configured to generate a power signal suitable for welding-type applications;
   a wire feeder constructed to deliver a filler material to a weld; and
   means for controlling a filler material delivery rate that establishes delivery of the filler material at a first rate, temporarily reduces the delivery rate to a level less than a user selected level without reversing a delivery direction based on welding arc initialization prior to arc stabilization, and establishes delivery of the filler material at the user selected level after arc stabilization.
16. The system of claim 15, further comprising means for detecting arc condition.

17. The system of claim 16, wherein the detecting means detects an initial arc condition and a stable arc condition.

18. The system of claim 15, wherein the filler material is welding wire.

19. The system of claim 15, wherein the controlling means reduces the delivery rate for a predetermined amount of time prior to arc stabilization.

20. The system of claim 15, wherein the controlling means comprises a programmable microprocessor.

* * * * *